(12) United States Patent
Zahalka et al.

(10) Patent No.: US 8,067,490 B2
(45) Date of Patent: Nov. 29, 2011

(54) BLENDED PHOSPHITE OR PHOSPHONITE COMPOSITIONS HAVING IMPROVED HYDROLYTIC STABILITY

(75) Inventors: Hayder Zahalka, Morgantown, WV (US); Karl Diefenbach, Morgantown, WV (US)

(73) Assignee: Chemtura Corporation, Middlebury, CT (US)

( * ) Notice: Subject to any disclaimer, the term of this patent is extended or adjusted under 35 U.S.C. 154(b) by 36 days.

(21) Appl. No.: 12/284,806

(22) Filed: Sep. 24, 2008

(65) Prior Publication Data

US 2010/0076129 A1    Mar. 25, 2010

(51) Int. Cl.
*C07F 9/6574* (2006.01)
*C08K 5/49* (2006.01)
*C09K 3/00* (2006.01)
*C09K 15/32* (2006.01)

(52) U.S. Cl. .................. 524/120; 524/115; 252/182.29; 252/182.3; 252/400.2; 252/400.24

(58) Field of Classification Search ............... 252/400.2, 252/182.29, 182.3, 400.24; 524/115, 120
See application file for complete search history.

(56) References Cited

U.S. PATENT DOCUMENTS

| | | | |
|---|---|---|---|
| 5,269,961 A * | 12/1993 | Tran ...................... | 252/182.24 |
| 5,844,026 A * | 12/1998 | Galbo et al. .............. | 524/100 |
| 5,856,550 A | 1/1999 | Linhart et al. | |
| 6,090,877 A * | 7/2000 | Bheda et al. .............. | 524/381 |
| 6,224,791 B1 * | 5/2001 | Stevenson et al. .......... | 252/589 |
| 6,362,258 B1 * | 3/2002 | Avakian et al. ............ | 524/100 |
| 6,392,041 B1 * | 5/2002 | Galbo et al. .............. | 544/218 |
| 6,680,351 B1 | 1/2004 | Russell et al. | |
| 6,770,693 B2 * | 8/2004 | Stein et al. ................ | 524/128 |
| 7,157,511 B2 | 1/2007 | Bobsein et al. | |
| 7,176,252 B2 | 2/2007 | Stevenson et al. | |
| 2004/0072932 A1 * | 4/2004 | Krohnke ................... | 524/238 |
| 2004/0116565 A1 * | 6/2004 | Kaprinidis et al. ......... | 524/247 |
| 2005/0009967 A1 | 1/2005 | Zahalka et al. | |
| 2005/0261403 A1 | 11/2005 | Tikuisis et al. | |
| 2007/0105992 A1 | 5/2007 | Zahalka et al. | |

FOREIGN PATENT DOCUMENTS

EP    781805 A1 * 7/1997
WO    WO 9749758 * 12/1997

* cited by examiner

*Primary Examiner* — Lorna M Douyon
*Assistant Examiner* — Tanisha Diggs
(74) *Attorney, Agent, or Firm* — Joseph Suhadolnik

(57) ABSTRACT

A composition and method for increasing the hydrolytic stability of a stabilizer composition comprising a first phosphite, a second phosphite, an optional phosphonite and an acid scavenger.

7 Claims, 4 Drawing Sheets

BLENDED PHOSPHITE OR PHOSPHONITE COMPOSITIONS HAVING IMPROVED HYDROLYTIC STABILITY

BACKGROUND OF THE INVENTION

1. Field of the Invention

The present invention relates to stabilizers for use in polymeric compositions. More particularly, the present invention relates to blends of phosphite or phosphonite compounds that have improved hydrolytic stability for use in the stabilization of polymeric compositions.

2. Description of Related Art

The need for stabilization of polymeric compositions is known, and the use of compounds such as hydroxylamines, amine oxides, lactones, hindered phenolics, and phosphites is also generally known.

The purpose of stabilizers is to prevent deterioration of polymers during processing at high temperatures and also to permit the manufacture of products with increased intrinsic quality because of the enhancement of their resistance to thermal and light degradation during use. In addition, because of these enhanced properties, their versatility is increased, and wider use is thereby made possible.

It is well known that phosphites are essential components in the stabilization of polymers. There is a synergistic effect between phenols and phosphites during melt processing. Phosphites decompose hydroperoxides while phenols trap peroxy radicals. To maximize this synergy, the phosphites should exhibit acceptable hydrolytic stability and have good storage stability in particular in hot and high humidity environments in order to minimize formation of undesired species that can result in feeding issues, black specks, and the like, thereby resulting in poor performance.

U.S. Pat. No. 5,438,086 discloses a class of hydrolytically stable bis(aralkylphenyl)pentaerythritol diphosphites that are said to be suitable as antioxidant additives in polyolefins, particularly, in polypropylene. The diphosphites are of low volatility, have a high thermal decomposition temperature, and resist yellowing when blended into a polyolefin base. A preferred diphosphite is bis(2,4-dicumylphenyl)pentaerythritol diphosphite.

U.S. Pat. No. 5,856,550 discloses compositions comprising (a) 25 to 99% of organic phosphite or phosphonite, based on the total weight of the composition, (b) an effective stabilizing amount of organic amine, and (c) an effective stabilizing amount of acid-binding metal salt, wherein the composition comprises no organic polymers or alkali metal phosphates as further components, as well as a process for stabilizing organic phosphites or phosphonites against hydrolysis by addition of organic amine and acid-binding metal salt. The compositions are said to be stable to hydrolysis and have good storage stability even at high atmospheric humidity. The compositions and process products can be used as stabilizers for organic material against the harmful action of heat, oxygen and/or light.

U.S. Pat. No. 6,680,351 discloses a polyolefin composition having high resistance to degradation, the composition being formed by combining components comprising at least one polyolefin component produced from a transition metal halide catalyst, bis(2,4-dicumylphenyl)pentaerythritol diphosphite, triisopropanolamine, a hydrotalcite component, and at least one phenol component.

U.S. Pat. No. 7,157,511 discloses that the whiteness and stability after processing of a polyolefin have been found to be improved upon the addition of a combination of at least one high activity phosphite and at least one hydrolytically stable phosphite.

U.S. Pat. No. 7,176,252 discloses a solid phosphite composite, having at least a portion in amorphous form, which includes at least one, preferably two or more phosphite antioxidants or alternatively at least one phosphite and at least one other polymer additive. The phosphites, at least one of which can initially be a liquid, are generally uniformly distributed since they are melt blended. A desired class of phosphites is the bis(arylalkylphenyl)pentaerythritol diphosphites, at least a portion of which is in amorphous form.

U.S. Pat. No. 7,361,703 discloses a process for the stabilization of thermoplastic polyolefins during melt processing operations. The stabilizer package of this invention is phenol free and must contain at least one aryl monophosphite and at least one diphosphite. The process of this invention is said to be suitable for the manufacture of polyethylene film.

U.S. Patent Application Publication No. 2005/0009967 discloses a process for the preparation of a neo diol phosphite stabilizer by a direct/solvent-less method, wherein a neoalkyl chlorophosphite is reacted directly with a mono- or di-substituted hydroxylated aromatic compound, for neo diol phosphite product having little or no odor. Also provided are polymeric compositions comprising a stabilizing amount of a neo diol phosphite having low to no odor.

U.S. Patent Application Publication No. 2007/0105992 discloses a stabilized composition comprising:
(A) a polymeric resin, and
(B) a stabilizing amount of a phosphite of the structure

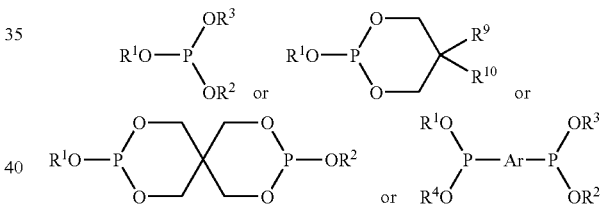

wherein
$R^1$, $R^2$, $R^3$, and $R^4$ are independently selected from the group consisting of alkyl moieties and substituted cycloalkyl moieties of the structure

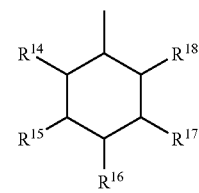

wherein
$R^{14}$, $R^{15}$, $R^{16}$, $R^{17}$, and $R^{18}$ are independently selected from the group consisting of hydrogen and hydrocarbyl, provided that at least one of $R^{14}$, $R^{15}$, $R^{16}$, $R^{17}$, and $R^{18}$ is not hydrogen and that no more than one of $R^1$, $R^2$, and $R^3$ is alkyl,
$R^9$ and $R^{10}$ are independently selected from the group consisting of hydrogen and hydrocarbyl, and
Ar is an aromatic moiety.

The disclosures of the foregoing are incorporated herein by reference in their entirety.

SUMMARY OF THE INVENTION

It has now been discovered that the hydrolytic stability, or hydrolytic resistance (HR), of various phosphites and phosphonites can be enhanced by blending them with other phosphites in the presence of an acid scavenger. Surprisingly, the blending of two or more phosphites having poor HR results in a combination having enhanced HR, which is critical for improved handling and superior polymer stability.

More particularly, the present invention is directed to a method for increasing the hydrolytic stability of a stabilizer selected from the group consisting of (A) a first phosphite of the structure:

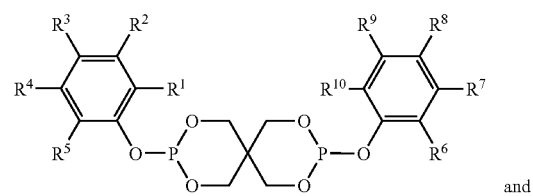

(B) a first phosphonite of the structure:

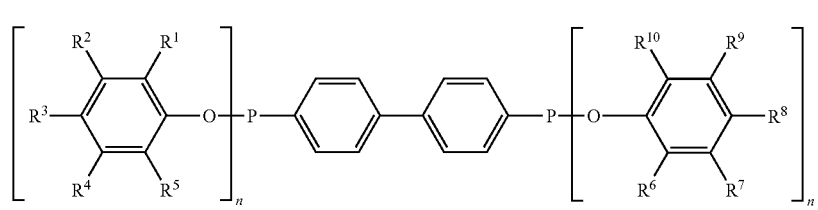

wherein
$R^1$, $R^2$, $R^3$, $R^4$, $R^5$, $R^6$, $R^7$, $R^8$, $R^9$, and $R^{10}$ are independently selected from the group consisting of hydrogen and alkyl, provided that at least one of $R^1$, $R^2$, $R^3$, $R^4$, $R^5$, $R^6$, $R^7$, $R^8$, $R^9$, and $R^{10}$ is alkyl, and n is 2;

wherein said method comprises blending said stabilizer with (a) from about 1 to about 25 weight percent, based on the total weight of the resulting blend, of a second phosphite of the structure

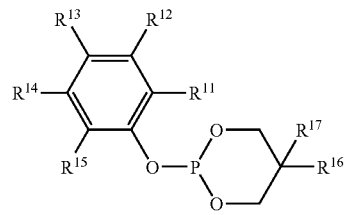

wherein $R^{11}$, $R^{12}$, $R^{13}$, $R^{14}$, and $R^{15}$ are independently selected from the group consisting of hydrogen and alkyl, provided that at least one of $R^{11}$, $R^{12}$, $R^{13}$, $R^{14}$, and $R^{15}$ is alkyl, and $R^{16}$ and $R^{17}$ are independently selected alkyl groups; and (b) from about 1 to about 10 weight percent, based on the total weight of the resulting blend, of an acid scavenger.

In another aspect, the present invention is directed to a composition comprising a blend of:

(I) a thermoplastic resin;
(II) a stabilizer selected from the group consisting of (A) a first phosphite of the structure:

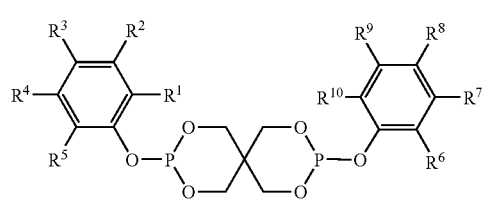

and (B) a first phosphonite of the structure:

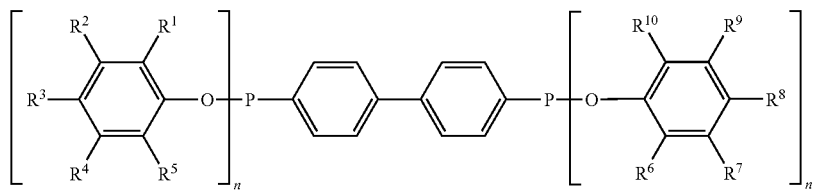

wherein
R$^1$, R$^2$, R$^3$, R$^4$, R$^5$, R$^6$, R$^7$, R$^8$, R$^9$, and R$^{10}$ are independently selected from the group consisting of hydrogen and alkyl, provided that at least one of R$^1$, R$^2$, R$^3$, R$^4$, R$^5$, R$^6$, R$^7$, R$^8$, R$^9$, and R$^{10}$ is alkyl, and
n is 2;
wherein said method comprises blending said stabilizer with
(III) a second phosphite of the structure:

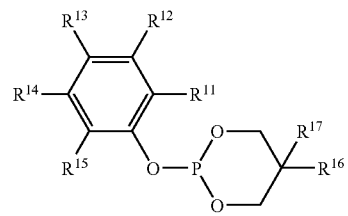

wherein R$^{11}$, R$^{12}$, R$^{13}$, R$^{14}$, and R$^{15}$ are independently selected from the group consisting of hydrogen and alkyl, provided that at least one of R$^{11}$, R$^{12}$, R$^{13}$, R$^{14}$, and R$^{15}$ is alkyl, and R$^{16}$ and R$^{17}$ are independently selected alkyl groups; and
(IV) an acid scavenger.

Preferably, the thermoplastic polymer is a polyolefin.

DESCRIPTION OF THE PREFERRED EMBODIMENTS

Figure 1:
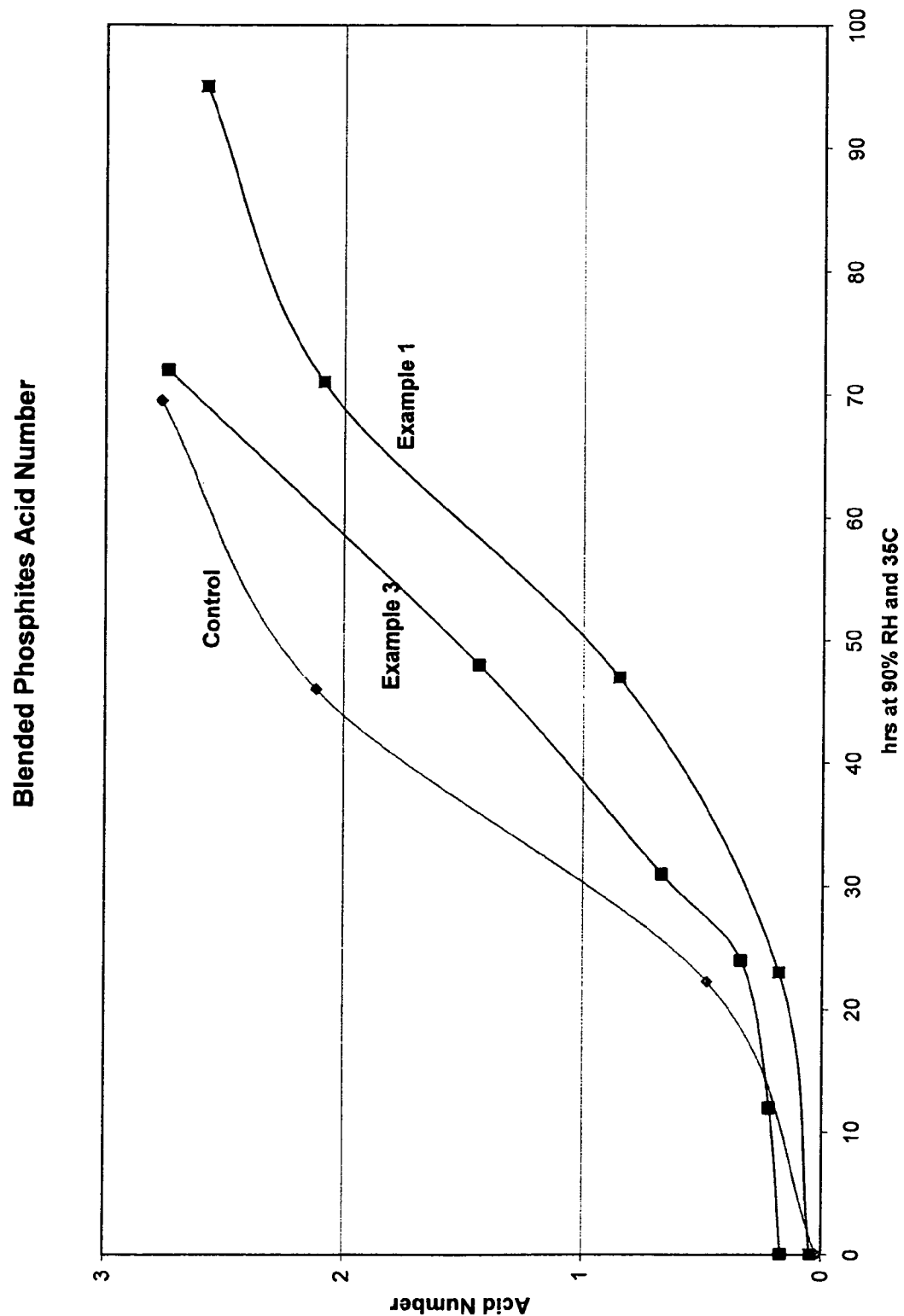
FIG. 1 is a graph comparing the acid numbers of the Control and Examples 1 and 3 of Table 1, infra, versus time.
Figure 2:
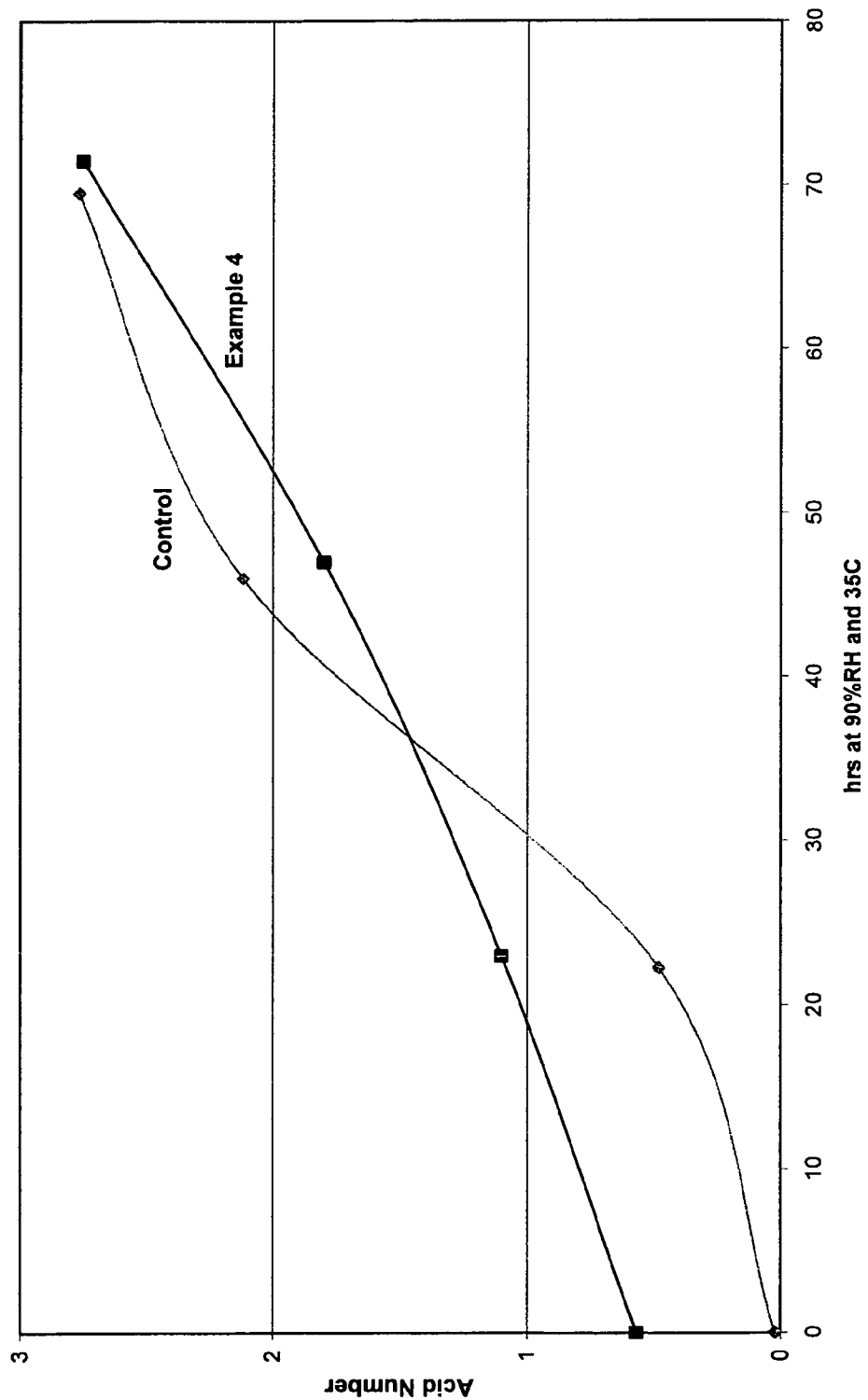
FIG. 2 is a graph comparing the acid numbers of the Control and Example 4 of Table 1, infra, versus time.
Figure 3:
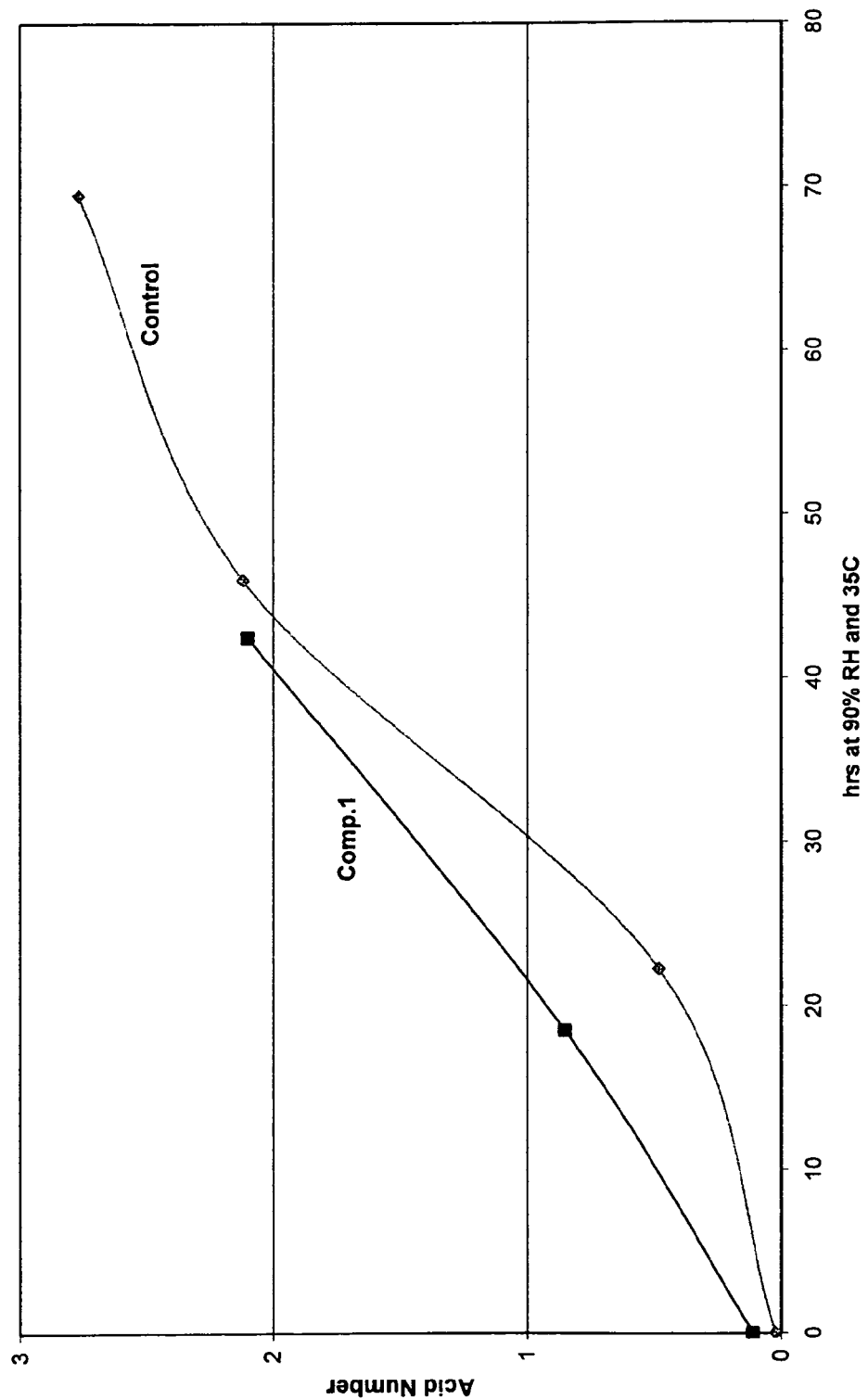
FIG. 3 is a graph comparing the acid numbers of the Control and Comparative Example 1 of Table 1, infra, versus time.
Figure 4:
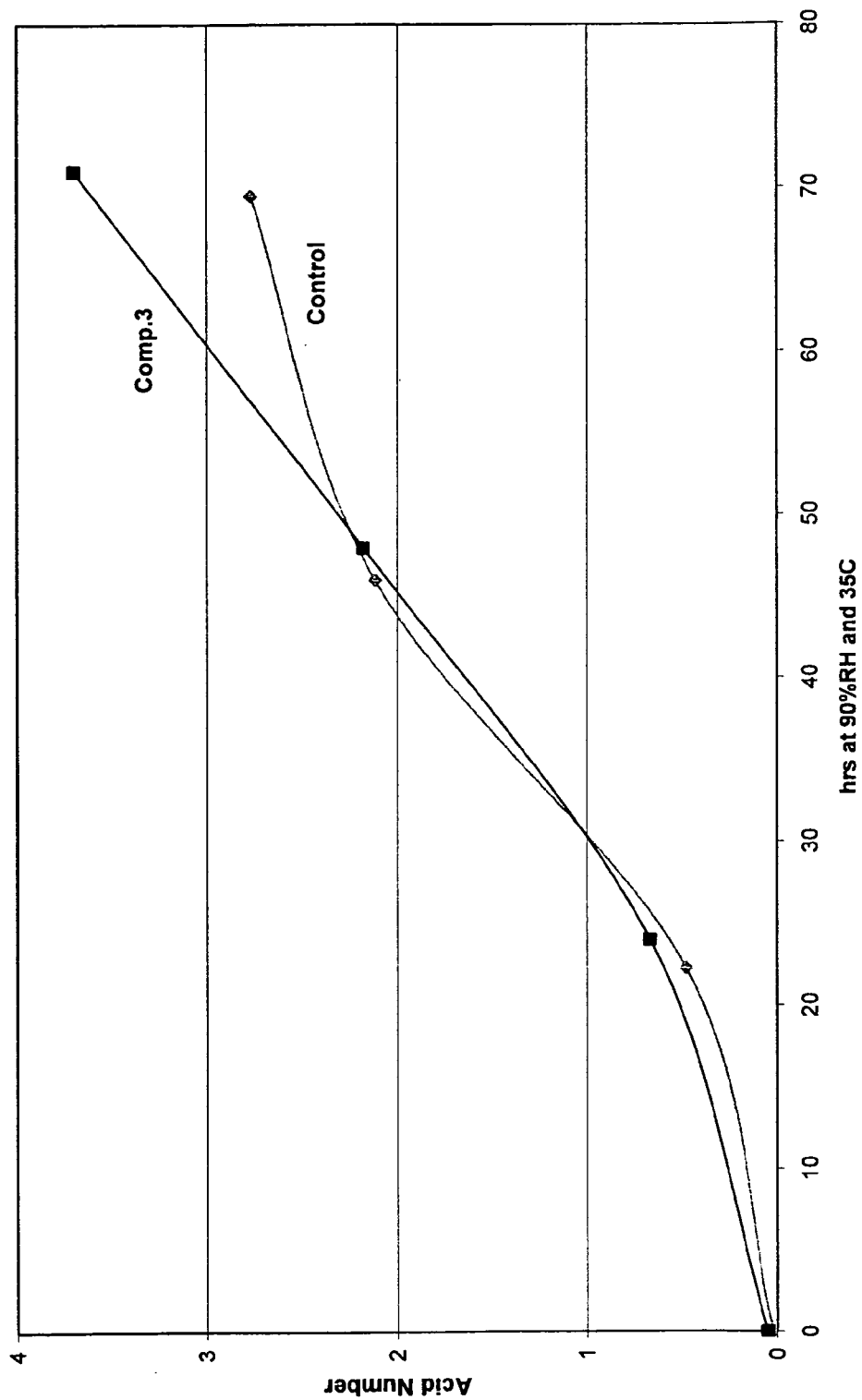
FIG. 4 is a graph comparing the acid numbers of the Control and Comparative Example 3 of Table 1, infra, versus time.

The present invention is directed to the use of a second phosphite having the structure

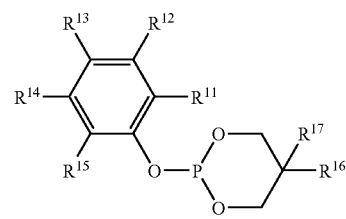

wherein R$^{11}$, R$^{12}$, R$^{13}$, R$^{14}$, and R$^{15}$ are independently selected from the group consisting of hydrogen and alkyl, provided that at least one of R$^{11}$, R$^{12}$, R$^{13}$, R$^{14}$, and R$^{15}$ is alkyl, and R$^{16}$ and R$^{17}$ are independently selected alkyl groups; and an acid scavenger to improve the hydrolytic stability of a stabilizer selected from the group consisting of (A) a first phosphite of the structure:

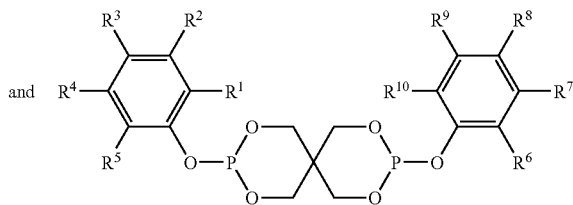

(B) a first phosphonite of the structure:

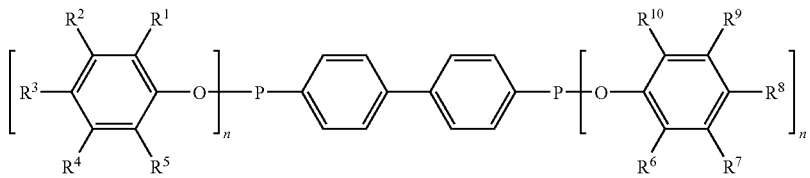

wherein
R$^1$, R$^2$, R$^3$, R$^4$, R$^5$, R$^6$, R$^7$, R$^8$, R$^9$, and R$^{10}$ are independently selected from the group consisting of hydrogen and alkyl, provided that at least one of R$^1$, R$^2$, R$^3$, R$^4$, R$^5$, R$^6$, R$^7$, R$^8$, R$^9$, and R$^{10}$ is alkyl, and
n is 2.

In the compound to be stabilized, described above, it is preferred that the alkyl group, or groups, present be selected from those having from one to eight carbon atoms, e.g., methyl, ethyl, propyl, butyl, pentyl, hexyl, heptyl, octyl, and isomers thereof, such as isopropyl, tert.-butyl, 2-ethyl hexyl, and the like. More preferably, such alkyl group(s) will be lower alkyl, i.e., alkyl of from one to four carbon atoms, e.g. methyl, ethyl, n-propyl, isopropyl, n-butyl, isobutyl, sec-butyl, or tert-butyl.

In a preferred embodiment, $R^1$, $R^3$, $R^8$, and $R^{10}$ will be alkyl, which may be the same or different, and $R^2$, $R^4$, $R^5$, $R^6$, $R^7$, and $R^9$ will be hydrogen. More preferably, $R^1$, $R^3$, $R^8$, and $R^{10}$ will all be the same and, most preferably, all will be tert.-butyl.

In the second phosphite, described above, it is preferred that the alkyl groups present be selected from those having from one to eight carbon atoms, e.g., methyl, ethyl, propyl, butyl, pentyl, hexyl, heptyl, octyl, and isomers thereof, such as isopropyl, tert.-butyl, 2-ethyl hexyl, and the like. More preferably, such alkyl groups will be lower alkyl, i.e., alkyl of from one to four carbon atoms, e.g., methyl, ethyl, n-propyl, isopropyl, n-butyl, isobutyl, sec-butyl, or tert-butyl.

In a preferred embodiment, $R^{11}$, $R^{13}$, and $R^{15}$ will be alkyl, which may be the same or different, and $R^{12}$ and $R^{14}$ will be hydrogen. More preferably, $R^{11}$, $R^{13}$, and $R^{15}$ will all be the same and, most preferably, all will be tert.-butyl. Preferably, $R^{16}$ and $R^{17}$ are ethyl and n-butyl, respectively.

Particularly preferred first phosphites for stabilization according to the present invention include those of the structures:

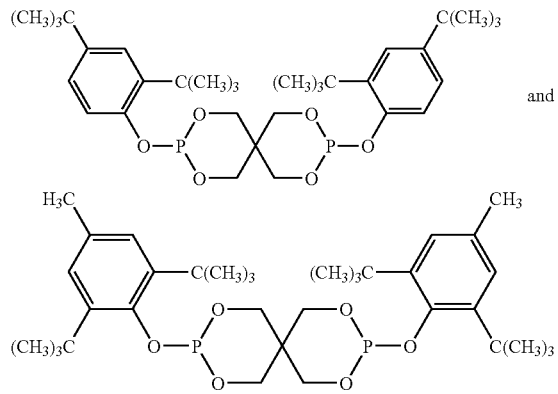

and

A particularly preferred first phosphonite for stabilization according to the present invention is one of the structure:

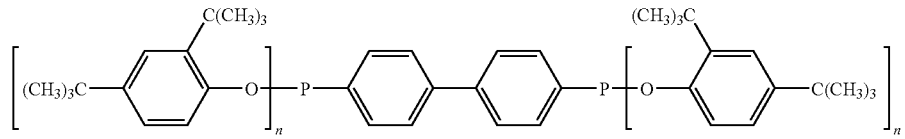

wherein n is 2.

The second phosphite is employed in the practice of the present invention in the range of from about one to about twenty-five weight percent, based on the total weight of the compound to be stabilized, the second phosphite, and the acid scavenger. Preferably, the second phosphite will be employed in a range of from about three to about ten weight percent, more preferably, about five to about seven weight percent.

It is known in the art to employ acid scavengers, also known as acid neutralizers, to polymers that are stabilized with phosphites. See, for example, U.S. Pat. Nos. 7,176,252 and 7,361,703. Included among the acid scavengers that can be employed in the practice of the present invention are calcium stearate, zinc stearate, calcium lactate, calcium stearoyl lactylate, zinc oxide, natural and synthetic hydrotalcites, and the like. A preferred acid scavenger for use herein is magnesium aluminum hydrotalcite, also known as DHT4A. DHT4A in combination with bis(2,4-di-t-butyl)pentaerythritol diphosphite is commercially available from Chemtura Corporation as Ultranox 627.

The acid scavenger is employed in the practice of the present invention in the range of from about one to about ten weight percent, based on the total weight of the compound to be stabilized, the second phosphite, and the acid scavenger. Preferably, the acid scavenger will be employed in a range of from about two to about nine weight percent, more preferably, about three to about eight weight percent.

The hydrolytically stabilized phosphites or phosphonites of the present invention can be used in the stabilization of a wide variety of thermoplastic resins known in the art, such as polyolefin homopolymers and copolymers, polyesters, polyurethanes, polyalkylene terephthalates, polysulfones, polyimides, polyphenylene ethers, styrenic polymers and copolymers, polycarbonates, acrylic polymers, polyamides, polyacetals and halide-containing polymers. Mixtures of different polymers, such as polyphenylene ether/styrenic resin blends, polyvinyl chloride/ABS or other impact modified polymers, such as methacrylonitrile and alpha-methylstyrene containing ABS, and polyester/ABS or polycarbonate/ABS and polyester plus some other impact modifier may also be used. Such polymers are available commercially or may be made by means well known in the art. However, the improved stabilizers of the present invention are particularly useful in thermoplastic polymers, such as polyolefins, polycarbonates, polyesters, polyphenylene ethers and styrenic polymers, due to the extreme temperatures at which thermoplastic polymers are often processed and/or used.

Polymers of monoolefins and diolefins, for example, polypropylene, polyisobutylene, polybutene-1, polymethylpentene-1, polyisoprene, or polybutadiene, as well as polymers of cycloolefins, for instance, of cyclopentene or norbornene, polyethylene (which optionally can be crosslinked), for example, high density polyethylene (HDPE), low density polyethylene (LDPE) and linear low density polyethylene (LLDPE), may be used. Mixtures of these polymers, for example, mixtures of polypropylene with polyisobutylene, polypropylene with polyethylene (for example, PP/HDPE, PP/LDPE) and mixtures of different types of polyethylene (for example, LDPE/HDPE), may also be stabilized. The improved phosphites and phosphonites are also useful with copolymers of monoolefins and diolefins with each other or with other vinyl monomers, such as, for example, ethylene/propylene, LLDPE and its mixtures with LDPE, propylene/butene-1, ethylene/hexene, ethylene/ethylpentene, ethylene/heptene, ethylene/octene, propylene/isobutylene, ethylene/butane-1, propylene/butadiene, isobutylene, isoprene, ethylene/alkyl acrylates, ethylene/alkyl methacrylates, ethylene/vinyl acetate (EVA) or ethylene/acrylic acid copolymers (EAA) and their salts (ionomers) and terpolymers of ethylene with propylene and a diene, such as hexadiene, dicyclopentadiene or ethylidene-norbornene, as well as mixtures of such copolymers and their mixtures with polymers mentioned above, for example, polypropylene/ethylene propylene-copolymers, LDPE/EVA, LDPE/EAA, LLDPE/EVA, and LLDPE/EAA.

The olefin polymers may be produced by, for example, polymerization of olefins in the presence of Ziegler-Natta catalysts optionally on supports such as, for example, $MgCl_2$, chromium salts and complexes thereof, silica, silica-alumina and the like. The olefin polymers may also be produced utilizing chromium catalysts or single site catalysts, e.g., metallocene catalysts such as, for example, cyclopentadiene complexes of metals such as Ti and Zr. As one skilled in the art would readily appreciate, the polyethylene polymers used herein, e.g., LLDPE, can contain various comonomers such as, for example, 1-butene, 1-hexene and 1-octene comonomers. Preferably, the polymer to be stabilized herein is polyethylene and includes, but is not limited to, high density polyethylene (HDPE), low density polyethylene (LDPE), and linear low density polyethylene (LLDPE).

Polymers may also include styrenic polymers, such as polystyrene, poly-(p-methylstyrene), poly-(α-methylstyrene), copolymers of styrene or α-methylstyrene with dienes or acrylic derivatives such as, for example, styrene/butadiene, styrene/acrylonitrile, styrene/alkyl methacrylate, styrene/maleic anhydride, styrene/maleimide, styrene/butadiene/ethyl acrylate, styrene/acrylonitrile/methylacrylate, mixtures of high impact strength from styrene copolymers and another polymer such as, for example, from a polyacrylate, a diene polymer, or an ethylene/propylene/diene terpolymer, and block copolymers of styrene such as, for example, styrene/butadiene/styrene, styrene/isoprene/styrene, styrene/ethylene/butylene/styrene or styrene/ethylene/propylene styrene.

Styrenic polymers may additionally or alternatively include graft copolymers of styrene or α-methylstyrene such as, for example, styrene on polybutadiene, styrene on polybutadiene-styrene or polybutadiene-acrylonitrile; styrene and acrylonitrile (or methacrylonitrile) on polybutadiene and copolymers thereof; styrene and maleic anhydride or maleimide on polybutadiene; styrene, acrylonitrile and maleic anhydride or maleimide on polybutadiene; styrene, acrylonitrile and methyl methacrylate on polybutadiene, styrene and alkyl acrylates or methacrylates on polybutadiene, styrene and acrylonitrile on ethylene-propylene-diene terpolymers, styrene and acrylonitrile on polyacrylates or polymethacrylates, styrene and acrylonitrile on acrylate/butadiene copolymers, as well as mixtures thereof with the styrenic copolymers indicated above.

Nitrile polymers can also be stabilized by the improved phosphites of the invention. These include homopolymers and copolymers of acrylonitrile and its analogs, such as polymethacrylonitrile, polyacrylonitrile, acrylonitrile/-butadiene polymers, acrylonitrile/alkyl acrylate polymers, acrylonitrile/alkyl methacrylate/butadiene polymers, and various ABS compositions as referred to above in regard to styrenics.

Polymers based on acrylic acids such as acrylic acid, methacrylic acid, methyl methacrylic acid, and ethacrylic acid and esters thereof, may also be stabilized. Such polymers include polymethylmethacrylate and ABS-type graft copolymers wherein all or part of the acrylonitrile-type monomer has been replaced by an acrylic acid ester or an acrylic acid amide. Polymers including other acrylic-type monomers such as acrolein, methacrolein, acrylamide, and methacrylamide may also be used.

Halogen-containing polymers may also be stabilized. These include resins such as polychloroprene, epichlorohydrin homo- and copolymers, polyvinyl chloride, polyvinyl bromide, polyvinyl fluoride, polyvinylidene chloride, chlorinated polyethylene, chlorinated polypropylene, fluorinated polyvinylidene, brominated polyethylene, chlorinated rubber, vinyl chloride-vinyl acetate copolymers, vinyl chloride-ethylene copolymer, vinyl chloride-propylene copolymer, vinyl chloride-styrene copolymer, vinyl chloride-isobutylene copolymer, vinyl chloride-vinylidene chloride copolymer, vinyl chloride-styrene-maleic anhydride terpolymer, vinyl chloride-styrene-acrylonitrile copolymer, vinyl chloride-butadiene copolymer, vinyl chloride isoprene copolymer, vinyl chloride-chlorinated propylene copolymer, vinyl chloride-vinylidene chloride-vinyl acetate terpolymer, vinyl chloride-acrylic acid ester copolymers, vinyl chloride-maleic acid ester copolymers, vinyl chloride-methacrylic acid ester copolymers, vinyl chloride-acrylonitrile copolymer and internally plasticized polyvinyl chloride.

Other polymers with which the present improved phosphites and phosphonites are useful include homopolymers and copolymers of cyclic ethers such as polyalkylene glycols, polyethylene oxide, polypropylene oxide or copolymers thereof with bis-glycidyl ethers; polyacetals, such as polyoxymethylene and those polyoxymethylenes which contain ethylene oxide as a comonomer; polyacetals modified with thermoplastic polyurethanes, acrylates or methacrylonitrile containing ABS; polyphenylene oxides and sulfides, and mixtures of polyphenylene oxides with polystyrene or polyamides; polycarbonates and polyester-carbonates; polysulfones, polyethersulfones and polyetherketones; and polyesters which are derived from dicarboxylic acids and diols and/or from hydroxycarboxylic acids or the corresponding lactones, such as polyethylene terephthalate, polybutylene terephthalate, poly-1,4-dimethylol-cyclohexane terephthalate, poly-2(2,2,4(4-hydroxyphenyl)-propane) terephthalate and polyhydroxybenzoates as well as block copolyetheresters derived from polyethers having hydroxyl end groups.

Polyamides and copolyamides which are derived from bisamines and dicarboxylic acids and/or from aminocarboxylic acids or the corresponding lactams such as polyamide 4, polyamide 6, polyamide 6/6, 6/10, 6/9, 6/12 and 4/6, polyamide 11, polyamide 12, aromatic polyamides obtained by condensation of m-xylene bisamine and adipic acid, polyamides prepared from hexamethylene bisamine and isophthalic or/and terephthalic acid and optionally an elastomer as modifier, for example, poly-2,4,4 trimethylhexamethylene terephthalamide or poly-m-phenylene isophthalamide may be stabilized. Further copolymers of the aforementioned polyamides with polyolefins, olefin copolymers, ionomers or chemically bonded or grafted elastomers, or with polyethers such as, for instance, with polyethylene glycol, polypropylene glycol or polytetramethylene glycols and polyamides or copolyamides modified with EPDM or ABS, can also benefit.

The hydrolytically stabilized phosphites and phosphonites of the present invention, when added to a resin, will be added in a stabilizing amount. As used herein, stabilizing amount or an effective amount of the phosphites and phosphonites of the invention means when the polymer composition containing the improved phosphites or phosphonites of the invention shows improved stability in any of its physical or color properties in comparison to an analogous polymer composition which does not include a phosphite or phosphonite of the invention. Examples of improved stability include improved stabilization against, for example, molecular weight degradation, color degradation, and the like from, for example, melt processing, weathering, and/or long term field exposure to heat, light, and/or other elements. In one example, an improved stability means one or both of lower initial color or additional resistance to weathering as measured, for example, by initial yellowness index (YI) or by resistance to yellowing and change in color when compared to a composition without the stabilizer additive.

Polymeric compositions to which the improved stabilizers of the present invention are added may optionally contain an additional stabilizer or mixture of stabilizers selected from the group consisting of the phenolic antioxidants, hindered amine stabilizers, the ultraviolet light absorbers, other phosphites and/or phosphonites, alkaline metal salts of fatty acids, additional hydrotalcites, metal oxides, epoxidized soybean oils, the hydroxylamines, the tertiary amine oxides, lactones, thermal reaction products of tertiary amine oxides, and the thiosynergists.

Thus, the resulting stabilized polymeric resin compositions optionally also contain various conventional additives, such as the following:

Antioxidants: Antioxidants may comprise alkylated monophenols, for example, 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4 isobutylphenol, 2,6-dicyclopentyl-4-methylphenol, 2-(α-methylcyclohexyl)-4,6 dimethylphenol, 2,6-di-octadecyl-4-methylphenol, 2,4,6-tricyclohexylphenol, 2,6-di-tert-butyl-4-methoxymethylphenol. Alkylated hydroquinones, for example, 2,6-di-tert-butyl-4-methoxyphenol, 2,5-di-tert-butylhydroquinone, 2,5-di-tert-amyl-hydroquinone, 2,6-diphenyl-4-octadecyloxyphenol, may also be used as antioxidants.

Antioxidants used may also comprise hydroxylated thiodiphenyl ethers, for example, 2,2'-thio-bis-(6-tert-butyl-4-methylphenol), 2,2'-thio-bis-(4-octylphenol), 4,4'-thio-bis-(6-tert-butyl-3-methylphenol), and 4,4'-thio-bis-(6-tert-butyl-2-methylphenol).

Alkylidene-bisphenols may be used as antioxidants as, for example, 2,2'-methylene-bis-(6-tert-butyl-4-methylphenol), 2,2'-methylene-bis-(6-tert-butyl-4-ethylphenol), 2,2'-methylene-bis-(4-methyl-6-(α-methylcyclohexyl)phenol), 2,2'-methylene-bis-(4-methyl-6-cyclohexylphenol), 2,2'-methylene-bis-(6-nonyl-4-methylphenol), 2,2'-methylene-bis-(6-nonyl-4-methylphenol), 2,2'-methylene-bis-(6-(α-methylbenzyl)-4-nonylphenol), 2,2'-methylene-bis-(6-(α,α-dimethylbenzyl)-4-nonyl-phenol), 2,2'-methylene-bis-(4,6-di-tert-butylphenol), 2,2'-ethylidene-bis-(6-tert-butyl-4-isobutylphenol), 4,4'methylene-bis-(2,6-di-tert-butylphenol), 4,4'-methylene-bis-(6-tert-butyl-2-methylphenol), 1,1-bis-(5-tert-butyl-4-hydroxy-2-methylphenol)butane, 2,6-di-(3-tert-butyl-5-methyl-2-hydroxybenzyl)-4-methylphenol, 1,1,3-tris-(5-tert-butyl-4-hydroxy-2-methylphenyl)butane, 1,1-bis-(5-tert-butyl-4-hydroxy2-methylphenyl)-3-dodecyl-mercaptobutane, ethyleneglycol-bis-(3,3-bis-(3'-tert-butyl-4'-hydroxyphenyl)-butyrate)-di-(3-tert-butyl-4-hydroxy-5-methylpentyl)-dicyclopentadiene, di-(2-(3'-tert-butyl-2'-hydroxy-5'-methylbenzyl)-6-tert-butyl-4-methylphenyl)terephthalate, and other phenolics such as monoacrylate esters of bisphenols such as ethylidiene bis-2,4-di-t-butylphenol monoacrylate ester and esters of 3-5 di-butyl hydroxyphenyl propionic acid. The phenolic antioxidants of particular interest are selected from the group consisting of n-octadecyl 3,5-di-tert-butyl-4-hydroxyhydrocinnamate, neopentanetetrayl tetrakis-(3,5-di-tert-butyl-4-hydroxyhydrocinnamate), di-n-octadecyl 3,5-di-tert-butyl-4-hydroxybenzylphosphonate, 1,3,5-tris(3,5-di-tert-butyl-4-hydroxybenzyl)-isocyanurate, thiodiethylene bis (3,5-di-tert-butyl-4-hydroxyhydrocinnamate), 1,3,5-trimethyl-2,4,6-tris(3,5-di-tert-butyl-4-hydroxybenzyl) benzene, 3,6-dioxaoctamethylene bis(3-methyl-5-tert-butyl-4-hydroxyhydrocinnamate), 2,6-di-tert-butyl-p-cresol, 2,2'-ethylidene-bis(4,6-di-tert-butylphenol), 1,3,5-tris(2,6-dimethyl-4-tert-butyl-3-hydroxybenzyl)isocyanurate, 1,1,3-tris(2-methyl-4-hydroxy-5-tert-butylphenyl)butane, 1,3,5-tris[2-(3,5-di-tert-butyl-4-hydroxyhydrocinnamoyloxy)ethyl] isocyanurate, 3,5-di-(3,5-di-tert-butyl-4-hydroxybenzyl) mesitol, hexamethylene bis(3,5-di-tert-butyl-4-hydroxyhydrocinnamate), 1-(3,5-di-tert-butyl-4-hydroxyanilino)-3,5-di(octylthio)-s-triazine, N,N'-hexamethylene-bis(3,5-di-tert-butyl-4-hydroxyhydrocinnamamide), calcium bis(ethyl 3,5-di-tert-butyl-4-hydroxybenzylphosphonate), ethylene bis[3,3-di(3-tert-butyl-4-hydroxyphenyl)butyrate], octyl 3,5-di-tert-butyl-4-hydroxybenzylmercaptoacetate, bis(3,5-di-tert-butyl-4-hydroxyhydrocinnamoyl)hydrazide, and N,N'-bis-[2-(3,5-di-tert-butyl-4-hydroxyhydrocinnamoyloxy)ethyl]-oxamide.

Other antioxidants that may be used include benzyl compounds, for example, 1,3,5-tris-(3,5-di-tert-butyl-4-hydroxybenzyl)-2,4,6-trimethylbenzene, bis-(3,5-di-tert-butyl-4-hydroxybenzyl)sulfide, isooctyl 3,5-di-tert-butyl-4-hydroxybenzyl-mercaptoacetate, bis-(4-tert-butyl-3-hydroxy-2,6-dimethylbenzyl)dithiol-terephthalate, 1,3,5-tris-(3,5-di-tert-butyl-4,10-hydroxybenzyl)isocyanurate, 1,3,5-tris-(4-tert-butyl-3-hydroxy-2,6-dimethylbenzyl)isocyanurate, dioctadecyl 3,5-di-tert-butyl-4-hydroxybenzylphosphonate, calcium salt of monoethyl 3,5-di-tert-butyl-4-hydroxybenzylphosphonate, and 1,3,5-tris-(3,5-dicyclohexyl-4-hydroxybenzyl)isocyanurate.

Acylaminophenols may be used as antioxidants, for example, 4-hydroxy-lauric acid anilide, 4-hydroxy-stearic acid anilide, 2,4-bis-octylmercapto-6-(3,5-tert-butyl-4-hydroxyanilino)-s-triazine, and octyl-N-(3,5-di-tert-butyl-4-hydroxyphenyl)-carbamate.

Esters of β-(5-tert-butyl-4-hydroxy-3-methylphenyl)-propionic acid with monohydric or polyhydric alcohols, for example, methanol, diethyleneglycol, octadecanol, triethyleneglycol, 1,6-hexanediol, pentaerythritol, neopentylglycol, tris-hydroxyethyl isocyanurate, thiodiethyleneglycol, and dihydroxyethyl oxalic acid diamide may also be used as antioxidants.

Antioxidants may also comprise amides of β-(3,5-di-tert-butyl-4-hydroxyphenol)-propionic acid, for example, N,N'-di-(3,5-di-tert-butyl-4-hydroxyphenylpropionyl)-hexamethylenediamine, N,N'-di-(3,5-di-tert-butyl-4-hydroxyphenylpropionyl)trimethylenediamine, and N,N'-di (3,5-di-tert-butyl-4-hydroxyphenylpropionyl)-hydrazine.

UV absorbers and light stabilizers may comprise 2-(2'-hydroxyphenyl)-benzotriazoles, for example, the 5'-methyl-, 3'5'-di-tert-butyl-, 5'-tert-butyl-, 5'(1,1,3,3-tetramethylbutyl)-, 5-chloro-3',5'-di-tert-butyl-, 5-chloro-3'-tert-butyl-5'-methyl-3'-sec-butyl-5'-tert-butyl-, 4'-octoxy, 3',5'-di-tert-amyl-3',5'-bis-(α,α-dimethylbenzyl)-derivatives.

2-Hydroxy-benzophenones, for example, the 4-hydroxy-4-methoxy-, 4-octoxy, 4-decyloxy-, 4-dodecyloxy-, 4-benzyloxy, 4,2',4'-trihydroxy- and 2'-hydroxy-4,4'-dimethoxy derivatives may also be used as UV absorbers and light stabilizers. UV absorbers and light stabilizers may also comprise esters of substituted and unsubstituted benzoic acids, for example, phenyl salicylate, 4-tert-butylphenyl salicylate, octylphenyl salicylate, dibenzoylresorcinol, bis-(4-tert-butylbenzoyl)-resorcinol, benzoylresorcinol, 2,4-di-tert-butylphenyl-3,5-di-tert-butyl-4-hydroxybenzoate, and hexadecyl-3,5-di-tert-butyl-4-hydroxybenzoate.

Acrylates, for example, α-cyano-β,β-diphenylacrylic acid-ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxycinnamic acid methyl ester, and N-(β-carbomethoxy-β-cyano-vinyl)-2-methyl-indoline may be used as UV absorbers and light stabilizers.

Other examples for UV absorbers and light stabilizers include nickel compounds, for example, nickel complexes of 2,2'-thio-bis(4-(1,1,1,3-tetramethylbutyl)-phenol), such as the 1:1 or 1:2 complex, optionally with additional ligands such as n-butylamine, triethanolamine or N-cyclohexyl-diethanolamine, nickel dibutyldithiocarbamate, nickel salts of 4-hydroxy-3,5-di-tert-butylbenzylphosphonic acid monoalkyl esters, such as of the methyl, ethyl, or butyl ester, nickel complexes of ketoximes such as of 2-hydroxy-4-methyl-pentyl undecyl ketoxime, nickel complexes of 1-phenyl-4-lauroyl-5-hydroxy-pyrazole, optionally with additional ligands.

Sterically hindered amines may be used as UV absorbers and light stabilizers as, for example, bis(2,2,6,6-tetramethylpiperidyl)-sebacate, bis-5 (1,2,2,6,6-pentamethylpiperidyl)-sebacate, n-butyl-3,5-di-tert-butyl-4-hydroxybenzyl malonic acid bis(1,2,2,6,6-pentamethylpiperidyl)ester, condensation product of 1-hydroxyethyl-2,2,6,6-tetramethyl-4-hydroxy-piperidine and succinic acid, condensation product of N,N'-(2,2,6,6-tetramethylpiperidyl)-hexamethylenediamine and 4-tert-octylamino-2,6-dichloro-1,3,5-s-triazine, tris-(2,2,6,6-tetramethylpiperidyl)-nitrilotriacetate, tetrakis-(2,2,6,6-tetramethyl-4-piperidyl)-1,2,3,4-butane-tetra-arbonic acid, 1,1'(1,2-ethanediyl)-bis-(3,3,5,5-tetramethylpiperazinone). These amines, typically called HALS (Hindered Amine Light Stabilizers), include butane tetracarboxylic acid 2,2,6,6-tetramethyl piperidinol esters. Such amines include hydroxylamines derived from hindered amines, such as di(1-hydroxy-2,2,6,6-tetramethylpiperidin-4-yl) sebacate; 1-hydroxy-2,2,6,6-tetramethyl-4-benzoxypiperidine; 1-hydroxy-2,2,6,6-tetramethyl-4-(3,5-di-tert-butyl-4-hydroxy hydrocinnamoyloxy)-piperidine; and N-(1-hydroxy-2,2,6,6-tetramethyl-piperidin-4-yl)-epsiloncaprolactam.

UV absorbers and light stabilizers may also comprise oxalic acid diamides, for example, 4,4'-di-octyloxy-oxanilide, 2,2'-di-octyloxy-5',5'-di-tert-butyloxanilide, 2,2'-didodecyloxy-5',5'di-tert-butyl-oxanilide, 2-ethoxy-2'-ethyl-oxanilide, N,N'-bis(3-dimethylaminopropyl)-oxalamide, 2-ethoxy-5-tert-butyl-2'-ethyloxanilide and its mixture with 2-ethoxy-2'-ethyl-5,4-di-tert-butyloxanilide and mixtures of ortho- and para-methoxy-, as well as of o- and p-ethoxy-, disubstituted oxanilides.

UV absorbers and light stabilizers also include hydroxyphenyl-s-triazines as, for example, 2,6-bis-(2,4-dimethylphenyl)-4-(2-hydroxy-4-octyloxyphenyl)-s-triazine, 2,6-bis(2,4-dimethylphenyl)-4-(2,4-dihydroxyphenyl)-s-triazine; 2,4-bis(2,4-dihydroxyphenyl)-6-(4-chlorophenyl)-s-triazine; 2,4-bis(2-hydroxy-4-(2-hydroxyethoxy)phenyl)-6-(4-chlorophenyl)-s-triazine; 2,4-bis(2-hydroxy-4-(2-hydroxyethoxy)phenyl)-6-phenyl-s-triazine; 2,4-bis(2-hydroxy-4-(2-hydroxyethoxy)-phenyl)-6-(2,4-dimethylphenyl)-s-triazine; 2,4-bis(2-hydroxy-4-(2-hydroxyethoxy)phenyl)-6-(4-bromo-phenyl)-s-triazine; 2,4-bis(2-hydroxy-4-(2-acetoryethoxy)phenyl)-6-(4-chlorophenyl)-s-triazine, 2,4-bis(2,4-dihydroxyphenyl)-6-(2,4-dimethylphenyl)-1-s-triazine.

Metal deactivators as, for example, N,N'-diphenyloxalic acid diamide, N-salicylal-N'-salicyloylhydrazine, N,N'-bis-salicyloylhydrazine, N,N'-bis-(3,5-di-tert-butyl-4-hydrophenylpropionyl)-2-hydrazine, salicyloylamino-1,2,4-triazole, and bis-benzyliden-oxalic acid dihydrazide, may also be used.

Peroxide scavengers, as, for example, esters of beta-thiodipropionic acid, for example the lauryl, stearyl, myristyl or tridecyl esters, mercaptobenzimidazole or the zinc salt of 2-mercaptobenzimidazole, zinc-dibutyldithiocarbamate, dioctadecyldisulfide, and pentaerythrotetrakis-(β-dodecylmercapto)-propionate may be used.

Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecyl hydroxylamine, N-heptadecyl-N-octadecylhydroxylamine, and N,N-dialkylhydroxylamine derived from hydrogenated tallow amine may also be used in some embodiments of the present invention.

Nitrones, for example, N-benzyl-α-phenyl nitrone, N-ethyl-α-methyl nitrone, N-octyl-α-heptyl nitrone, N-lauryl-α-undecyl nitrone, N-tetradecyl-α-tridecyl nitrone, N-hexadecyl-α-pentadecyl nitrone, N-octadecyl-α-heptadecylnitrone, N-hexadecyl-α-heptadecylnitrone, N-octadecyl-α-pentadecyl nitrone, N-heptadecyl-α-heptadecyl nitrone, N-octadecyl-α-hexadecyl nitrone, and nitrone derived from N,N-dialkylhydroxylamine derived from hydrogenated tallow amine may also be used.

Polyamide stabilizers, for example, copper salts in combination with iodides and/or phosphorus compounds and salts of divalent manganese.

Basic co-stabilizers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example, Ca stearate, calcium stearoyl lactate, calcium lactate, Zn stearate, Mg stearate, for example, Na ricinoleate and K palmitate, antimony pyrocatecholate or zinc pyrocatecholate, including neutralizers, such as hydrotalcites and synthetic hydrotalcites, and Li, Na, Mg, Ca, and Al hydroxy carbonates may be used in other embodiments of the present invention as, also, MgZn hydroxycarbonates, MgAl hydroxycarbonates and AlZn hydroxycarbonates, and metal oxides such as ZnO, MgO, and CaO.

Nucleating agents, for example, 4-tert-butylbenzoic acid, adipic acid, diphenylacetic acid, sodium salt of methylene bis-2,4-dibutylphenyl, cyclic phosphate esters, sorbitol tris-benzaldehyde acetal, and the sodium salt of bis(2,4-di-t-butylphenyl) phosphate or the Na salt of ethylidene bis(2,4-di-t-butylphenyl) phosphate may also be used in some embodiments.

Fillers and reinforcing agents may comprise, for example, calcium carbonate, silicates, glass fibers, asbestos, talc, kaolin, mica, barium sulfate, metal oxides and hydroxides, carbon black, and graphite.

Other additives may be, for example, plasticizers, epoxidized vegetable oils such as epoxidized soybean oils, lubricants, emulsifiers, pigments, optical brighteners, flameproofing agents, anti-static agents, blowing agents, and thiosynergists such as dilaurylthiodipropionate or distearylthiodipropionate, and the like.

Additional phosphites or phosphonites as, for example, triphenyl phosphite, diphenylalkyl phosphites, phenyldialkyl phosphites, tris(nonyl-phenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, tristearyl sorbitol triphosphite, and tetrakis(2,4-di-tert-butylphenyl)4,4'-biphenylene diphosphonite may be used in some embodiments of the invention in addition to the first and second phosphites of the invention. The use of tris(2,4-di-tert-butylphenyl)phosphite as a third phosphite has been found to be particularly advantageous in the practice of the present invention and is preferred.

The additives and stabilizers described herein are preferably present in an amount effective to improve composition stability. When one of the aforementioned additives and stabilizers is utilized, the amount is generally less than about 5 weight percent based on the weight of the resin and is preferably at least about 50 ppm based on the weight of the resin.

The improved stabilizers of this invention advantageously assist with the stabilization of polymer resin compositions especially in high temperature processing against changes in melt index and/or color, even though the polymer resin may undergo a number of extrusions. These stabilizers may readily be incorporated into the resin compositions by conventional techniques, at any convenient stage prior to the manufacture of shaped articles therefrom. For example, the stabilizer may be mixed with the resin in dry powder form, or a suspension or emulsion of the stabilizer may be mixed with a solution, suspension, or emulsion of the polymer.

The compositions containing the improved stabilizers of the present invention can be prepared by a variety of methods such as those involving intimate admixing of the ingredients with any additional materials desired in the formulation. Suitable procedures include solution blending and melt blending. Because of the availability of melt blending equipment in commercial polymer processing facilities, melt processing procedures are generally preferred. Examples of equipment used in such melt compounding methods include co-rotating and counter-rotating extruders, single screw extruders, disc-pack processors and various other types of extrusion equipment. In some instances, the compounded material exits the extruder through small exit holes in a die, and the resulting strands of molten resin are cooled by passing the strands through a water bath. The cooled strands can be chopped into small pellets for packaging and further handling.

Detailed descriptions of processes for obtaining granular forms of additives can be found, for example, in U.S. Pat. Nos. 5,240,642 and 5,844,042.

All of the ingredients may be added initially to the processing system, or else certain additives may be pre-compounded with each other or with a portion of the polymeric resin to make a stabilizer concentrate. Moreover, it is also sometimes advantageous to employ at least one vent port to allow venting (either atmospheric or vacuum) of the melt. Those of ordinary skill in the art will be able to adjust blending times and temperatures, as well as component addition location and sequence, without undue additional experimentation.

While the improved stabilizers of this invention may be conveniently incorporated by conventional techniques into polymeric resins before the fabrication thereof into shaped articles, it is also possible to apply them by a topical application to the finished articles. Articles may comprise the instant stabilizer compounds and resins and may be made into, for example, head lamp covers, roofing sheets, telephone covers, aircraft interiors, building interiors, computer and business machine housings, automotive parts, and home appliances. The articles may be made by extrusion, injection molding, roto-molding, compaction, and other methods. This may be particularly useful with fiber applications where the instant stabilizers are applied topically to the fibers, for example, by way of a spin finish during the melt spinning process.

The improved stabilizer compounds of the present invention may also be useful in thermoset resin compositions such as polyurethanes, epoxides, melamine, and phenolics and may be useful in thermoset/plastic blends. They may be present at the levels set out above for thermoplastic resin compositions.

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

EXAMPLES

In the following table, Table 1, the following phosphites are referred to by their commercial trade designations: Ultranox 626 (Chemtura Corporation), Ultranox 641 (Chemtura Corporation), Alkanox 240 (Chemtura Corporation), Weston 619 (Chemtura Corporation), and Doverphos S-9228 (Dover Chemical Corporation).

Ultranox 626 is bis(2,4-di-t-butylphenyl)pentaerythritol diphosphite. Its structure is:

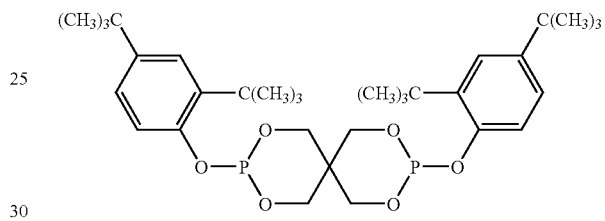

Ultranox 641 is 2,4,6-tri-t-butylphenyl-2-butyl-2-ethyl-1,3-propanediol phosphite. Its structure is:

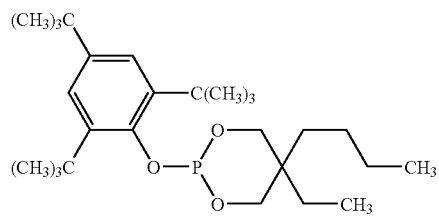

Alkanox 240 is tris(2,4-di-t-butylphenyl)phosphite. Its structure is:

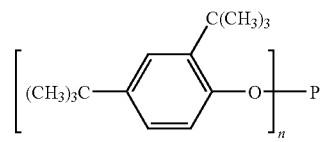

wherein n=3.

Weston 619 is distearyl pentaerythritol diphosphite. Its structure is:

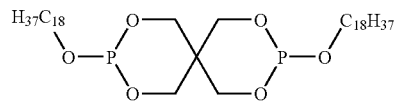

Doverphos S-9228 is bis(2,4-dicumylphenyl)pentaerythritol diphosphite. Its structure is:

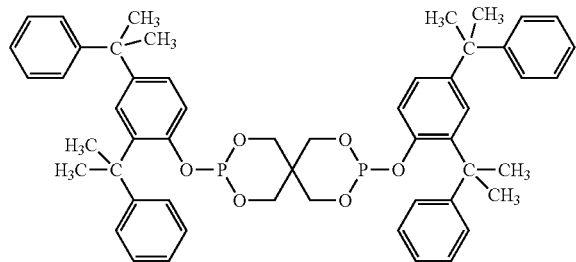

TABLE 1

Hydrolytic Stability of Phosphite Blends at 35 and 90% Relative Humidity
Composition Expressed in Weight Percent

| Example | Phosphite 1 | Phosphite 2 | Phosphite 3 | Phosphite 4 | Phosphite 5 | DHT-4A | Hours to 1% Weight Gain |
|---|---|---|---|---|---|---|---|
| Control | 93 | — | — | — | — | 7 | 48 |
| 1 | 87 | 6 | — | — | — | 7 | 82 |
| 2 | 82 | 11 | — | — | — | 7 | 75 |
| 3 | 70 | 23 | — | — | — | 7 | 56 |
| Comparative 1 | 87 | — | — | 6 | — | 7 | 33 |
| Comparative 2 | 82 | — | — | — | 11 | 7 | 32 |
| Comparative 3 | 87 | — | 6 | — | — | 7 | 51 |
| 4 | 87 | 6 | — | — | — | 7 | 49 |
| Comparative 4 | 87 | — | 6 | — | — | 7 | 36 |
| Comparative 5 | 46.5 | — | 50 | — | — | 3.5 | 43.2 |
| Comparative 6 | 46.5 | — | 50 | — | — | 3.5 | 57.1 |
| 5 | 43.7 | 6 | 47 | — | — | 3.3 | 99.8 |
| 6 | 43.7 | 6 | 47 | — | — | 3.3 | 72.5 |

In Table 1:

Examples 1-3 and 5 and Comparative Examples 1-3 and 5 were made by cold extrusion.

Examples 4 and 6 and Comparative Examples 4 and 6 were made by hot extrusion.

Phosphite 1 is Ultranox 626.

Phosphite 2 is Ultranox 641.

Phosphite 3 is Alkanox 240.

Phosphite 4 is Weston 619.

Phosphite 5 is Doverphos S-9228.

Cold Extruded Pellets

Example 1 in Table I

Ultranox 626 (4.75 kg), powdered Ultranox 641 (0.33 kg, ground using Fitzmil to provide smaller particle size <60 mesh), and DHT-4A (0.39 kg) are blended for 30 to 45 minutes.

The homogenized mixture is fed through an Acrison volumetric feeder into a California Pellet Mill using a 1 thick die with ⅛ diameter die holes and straight ribbed rolls. The feed rate to the pellet mill is adjusted to maintain good pellet quality and sent to a twenty mesh screener for fines removal, then recycled back into the fresh feed. The process is performed in a humidity and temperature-controlled environment.

Hot Extruded Pellets

Example 4 in Table I

Ultranox 626 (1.57 kg), Ultranox 641 (0.11 kg), and DHT-4A (0.13 kg) are charged to a planetary mixer for powders.

The homogenized mixture is fed into Brabender laboratory extruder having a cochlea with a length of 24 D (800 mm), a diameter of 33 mm, and a compression ratio of 1:4, which has the possibility of heating in eight different zones of the cochlea. The mixture is extruded through four holes having a diameter of 2.5 mm with a rotation rate of the cochlea of 320 rpm and a constant temperature profile of 155.

The spaghetti thus obtained, after being cooled down to room temperature, is cut into pieces to obtain pellets having a diameter of about 2-2.5 mm and a length between 8 and 12 mm.

Hydrolytic Stability

Example 3 in Table I

Control of Hydrolytic Conditions

The measurement of hydrolysis is dependent on a test chamber that is capable of producing a constant environment with uniform humidity and temperature and is accurately controlled. The Series 2500 benchtop two-pressure humidity generator made by Thunder Scientific Corporation of Albuquerque, N. Mex., is such an instrument. The reproducibility of hydrolysis measurements depends in large measure on the precision of the test chamber. See the specifications below:

Model 2500 Two-Pressure Humidity Generator Specifications

Relative Humidity Accuracy+/−0.5%
Chamber Temperature Accuracy+/−0.6
Chamber Temperature Uniformity+/−0.1

Weight Gain

One gram of a sample to be tested is weighed in a 20 mL scintillation vial and the vial is placed in a constant temperature/humidity chamber. The vial is weighed at appropriate intervals and the weights are recorded. The weight gain is expressed as a percent of the initial weight of the sample over time.

Acid Number

The acid content of the hydrolyzed phosphite is determined by measuring the equivalent amount of base necessary to neutralize a known amount of sample. A quantity of approximately 10 grams of the sample is placed in a glass Petri dish, and the dish is placed in the constant temperature/humidity chamber. At regular intervals the chamber is opened, and a one gram sample is removed from the Petri dish for the acid number determination.

The present invention is illustrated in Examples 1-6 compared to the control. The hydrolytic stability of a phosphite (measured by the time it takes to gain 1 weight %) is superior for Example 1 compared to the control. That is, the addition of 6% Ultranox 641 had a marked effect on the hydrolytic stability of Ultranox 626 as shown in Table 1, i.e., 82 hours as opposed to 48 hours. Surprisingly, an increase in Ultranox 641 content beyond ten weight percent (Examples 2 and 3) resulted in a decrease in the hydrolytic stability of Ultranox 626 compared to Example 1, although the results were still better than those obtained with the control.

It is well known that Alkanox 240 (Phosphite 3) and Doverphos S-9228 (Phosphite 5) exhibit excellent hydrolytic stability and that the addition of these phosphites to Ultranox 626 results in a higher performance blend (see U.S. Pat. Nos. 6,680,351, 7,157,511, and 7,176,252). The above data demonstrate that under cold extrusion, or even hot extrusion, the addition of 6 weight % of either Alkanox 240 or Doverphos S-9228 did not match the unexpected and unpredictable performance of Ultranox 641.

In view of the many changes and modifications that can be made without departing from principles underlying the invention, reference should be made to the appended claims for an understanding of the scope of the protection to be afforded the invention.

What is claimed is:

1. A thermoplastic resin composition comprising a thermoplastic resin and a phosphite stabilizer composition with enhanced hydrolytic resistance, said phosphite stabilizer composition comprising:

a first phosphite of the structure

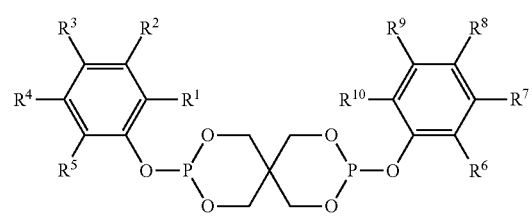

wherein $R^1$, $R^3$, $R^8$, and $R^{10}$ are selected from alkyl groups having from 1 to 8 carbon atoms; $R^2$, $R^4$, $R^5$, $R^6$, $R^7$ and $R^9$ are hydrogen;

an optional first phosphonite of the structure

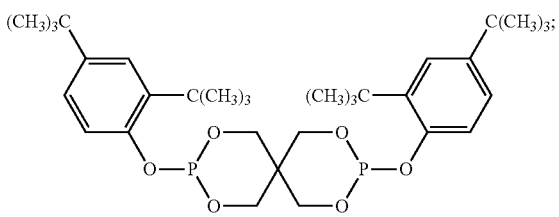

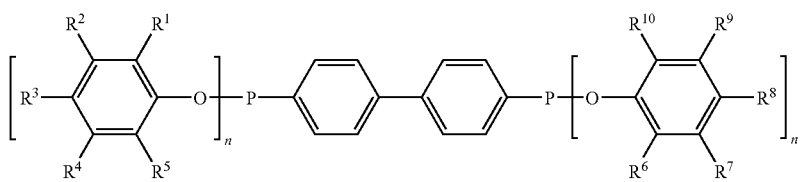

wherein $R^1$, $R^3$, $R^8$, and $R^{10}$ are selected from alkyl groups having from 1 to 8 carbon atoms; $R^2$, $R^4$, $R^5$, $R^6$, $R^7$ and $R^9$ are hydrogen; n is 2;

a second phosphite of the structure

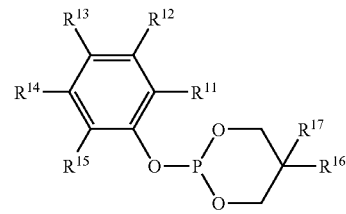

wherein $R^{11}$, $R^{13}$, $R^{15}$, $R^{16}$ and $R^{17}$ are selected from alkyl groups having from 1 to 8 carbon atoms, and $R^{12}$ and $R^{15}$ are hydrogen;

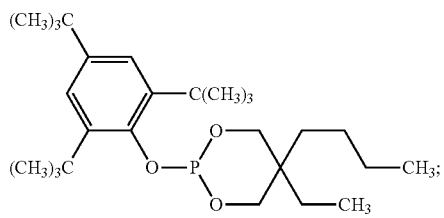

and an acid scavenger,
wherein the first phosphite is present from 82 to 87 weight percent, the second phosphite is present from 6 to 11 weight percent and the acid scavenger is present from about 1 to about 10 weight percent, each based on the total weight of first phosphite, second phosphite, acid scavenger and optional first phosphonite.

2. The thermoplastic resin composition according to claim 1 wherein the acid scavenger is selected from the group consisting of calcium stearate, zinc stearate, calcium lactate, calcium stearoyl lactylate, zinc oxide, and natural and synthetic hydrotalcites.

3. The thermoplastic resin composition according to claim 2 wherein the acid scavenger is selected from the group consisting of natural and synthetic hydrotalcites.

4. The thermoplastic resin composition according to claim 1 wherein the phosphite stabilizer composition is prepared by cold extrusion or hot extrusion of a mixture of the first phosphite, second phosphite, acid scavenger and optional first phosphonite.

5. The thermoplastic resin composition according to claim 4 wherein the phosphite stabilizer composition is prepared by cold extrusion of a homogenized mixture of the first phosphite, second phosphite, acid scavenger and optional first phosphonite.

6. The thermoplastic resin composition according to claim 5 wherein the phosphite stabilizer composition is in the form of pellets prepared by feeding the homogenized mixture of the first phosphite, second phosphite, acid scavenger and optional first phosphonite into a pellet mill to form pellets.

7. The thermoplastic resin composition according to claim 3 wherein the acid scavenger is magnesium aluminum hydrotalcite.

\* \* \* \* \*